(12) United States Patent
Bennett

(10) Patent No.: US 6,863,173 B2
(45) Date of Patent: Mar. 8, 2005

(54) REORIENTATION OF ARTICLES

(75) Inventor: Robert Bennett, West Midlands (GB)

(73) Assignee: Ishida Co., Ltd., Kyoto (JP)

(*) Notice: Subject to any disclaimer, the term of this patent is extended or adjusted under 35 U.S.C. 154(b) by 205 days.

(21) Appl. No.: 10/183,049

(22) Filed: Jun. 27, 2002

(65) Prior Publication Data

US 2003/0015399 A1 Jan. 23, 2003

(30) Foreign Application Priority Data

Jul. 2, 2001 (GB) .............................. 0116175

(51) Int. Cl.$^7$ ............................. B65G 47/24
(52) U.S. Cl. ..................... 198/416; 198/456
(58) Field of Search .................. 198/416, 456

(56) References Cited

U.S. PATENT DOCUMENTS

| | | | | |
|---|---|---|---|---|
| 1,028,766 A | * | 6/1912 | Montgomery | 198/416 |
| 2,120,314 A | * | 6/1938 | Spellacy et al. | 198/416 |
| 2,602,554 A | * | 7/1952 | Griffith | 198/416 |
| 2,664,816 A | * | 1/1954 | Gibson | 198/416 |
| 2,667,959 A | * | 2/1954 | Rogers | 198/416 |
| 2,728,307 A | * | 12/1955 | Rhodes | 198/416 |
| 3,189,156 A | | 6/1965 | Hyer et al. | |
| 3,269,513 A | * | 8/1966 | Del Rosso | 198/416 |
| 3,432,023 A | * | 3/1969 | Lucas | 198/416 |
| 3,920,118 A | | 11/1975 | Krooss | |
| 4,682,682 A | * | 7/1987 | Hartlepp | 198/368 |
| 6,435,332 B1 | * | 8/2002 | Price | 198/416 |
| 6,454,257 B1 | * | 9/2002 | Cisar | 198/416 |

FOREIGN PATENT DOCUMENTS

| | | |
|---|---|---|
| DE | 3322193 A1 | 1/1985 |
| EP | 0227254 A1 | 7/1987 |
| GB | 904735 | 8/1962 |
| GB | 1053239 A | 12/1966 |
| JP | 1-288510 * | 5/1963 ............... 198/416 |
| JP | 5-105226 | 4/1993 |

OTHER PUBLICATIONS

EP Serach Report dated Jan. 18, 2002 for corresponding application No. GB 0116175.1.

Brokowski, M., et al., "Optimal Curved Fences for Part Alignment on a Belt," Journal of Mechanical Design, Mar. 1995, vol. 117, pp. 27–35.

* cited by examiner

Primary Examiner—Douglas A Hess
(74) Attorney, Agent, or Firm—Staas & Halsey LLP

(57) ABSTRACT

An apparatus and method for the reorientation of articles. According to one aspect of the invention, a conveyor having a support surface for an article to be reoriented displaces the support surface in a conveying direction. The article being conveyed by displacement of the support surface contacts an abutment, adjacent to the support surface, having an elongate abutment surface extending at an angle to the conveying direction. Continued displacement of the support surface turns the article as it slides in contact with the abutment surface. An orienting gate assembly, located downstream of the abutment surface in the conveying direction, has a pair of gates that are displaceable between two configurations. In a closed configuration, the gates define a channel that narrows in the conveying direction to trap the article. In an open configuration, the channel is widened at the downstream end to release the trapped article.

22 Claims, 1 Drawing Sheet

REORIENTATION OF ARTICLES

CROSS-REFERENCE TO RELATED APPLICATION

This application is based on and claims priority to UK Patent Application No. 0116175.1 filed on Jul. 2, 2001, titled "REORIENTATION", the contents of which are hereby incorporated by reference.

BACKGROUND OF THE INVENTION

1. Field of the Invention

The present invention relates to an apparatus and method for the reorientation of articles. More particularly, the present invention relates to an apparatus and method for the reorientation of articles of moderate weight (e.g., from a few hundred grams to a few kilograms) that might be damaged by rough handling.

2. Description of the Related Art

In the preparation of packaged items for sale in supermarkets, such as poultry and other meat products, a food item is commonly placed on a tray and over-wrapped in a packaging machine. The wrapped article emerges from the packaging machine and is placed on a conveyor belt. Conventional packaging machines tend to output articles in a fixed orientation, generally with the longer axes of the articles extending across the output conveyor. For subsequent operations, such as application of labels, the articles tend to have the wrong orientation. Up to now, it has been necessary to reorient all the articles by hand. The present invention enables automation of the reorientation of the articles.

SUMMARY OF THE INVENTION

In one aspect of the present invention, there is provided a reorientation apparatus comprising a conveyor having a support surface for an article to be reoriented. The conveyor is operable to displace the support surface in a conveying direction. The article being conveyed by displacement of the support surface contacts an abutment having an elongate abutment surface extending at an angle to the conveying direction adjacent to the support surface. Continued displacement while the article is in contact with the support surface tends to turn the article as it slides in contact with the abutment surface. An orienting gate assembly is located downstream of the abutment surface in the conveying direction. The gate assembly has a pair of gates that are displaceable between two configurations. In a first narrow or closed configuration, the gates define a passageway or channel that narrows in the conveying direction so that an article can pass into the channel and be trapped. In a second or open configuration, the channel is wider at least at the downstream end so that a trapped article may be released.

The support surface and the abutment surface have frictional properties such that an article tends to turn by contacting these surfaces. For example, the support surface and the abutment surface have frictional surfaces that induce a torque while the article is conveyed sufficient to rotate the article to an intended position. The gates generally have low frictional surfaces so that an article can slide into the narrowing channel, continuing the reorientation begun by contact with the abutment surface so that reorientation ends with the article having a predetermined orientation relative to the conveying direction and centered on a line through the gate assembly.

Another aspect of the present invention provides a method of reorienting articles in which an article is conveyed on a frictional support surface and abuts an angled frictional abutment surface. Continued conveying causes the article to turn. Thereafter, the article passes into a narrowing passageway or channel defined between a pair of low-friction gates. The article momentarily stops when engaging the gates, and the gates are then opened to allow the article to continue to be conveyed. The method may employ the apparatus described above.

A further aspect of the present invention provides an apparatus for reorienting an article. A conveyor supports an article and moves in a conveying direction to move the article in the conveying direction. An abutment member with an elongate abutment surface extends at an angle to the conveying direction. The article engages the abutment member as the article is moved in the conveying direction by the conveyor to rotate the article. A gate assembly receives the rotated article from the abutment member and further rotates the article to a predefined orientation.

A further aspect of the present invention provides an apparatus for reorienting an article that includes an abutment member having an elongate abutment surface extending at an angle to a conveying direction of an article being conveyed. The article engages the abutment member as the article is moved in the conveying direction to rotate the article. A gate assembly receives the rotated article from the abutment member and further rotates the article to a predefined orientation.

A further aspect of the present invention provides an apparatus including a conveyor that conveys an article in a conveying direction. The article is off-center on the conveyor and has a long axis extending transverse to the conveying direction. An abutment member has an elongate abutment surface extending at an angle to the conveying direction so that the abutment member contacts the article as the article is being conveyed in the conveying direction, to thereby exert a torque on the article, which rotates the article so that the long axis of the rotated article is at a smaller angle to the conveying direction than before being rotated. A gate assembly receives the rotated article as the rotated article continues to be conveyed in the conveying direction, and further rotates the article into a centralized position on the conveyor with the long axis of the article parallel to the conveying direction. The further rotated article continues to be conveyed by the conveyor.

These together with other aspects and advantages that will be subsequently apparent, reside in the details of construction and operation as more fully hereinafter described and claimed, reference being had to the accompanying drawing forming a part hereof.

DETAILED DESCRIPTION OF THE PREFERRED EMBODIMENTS

Figure 1:
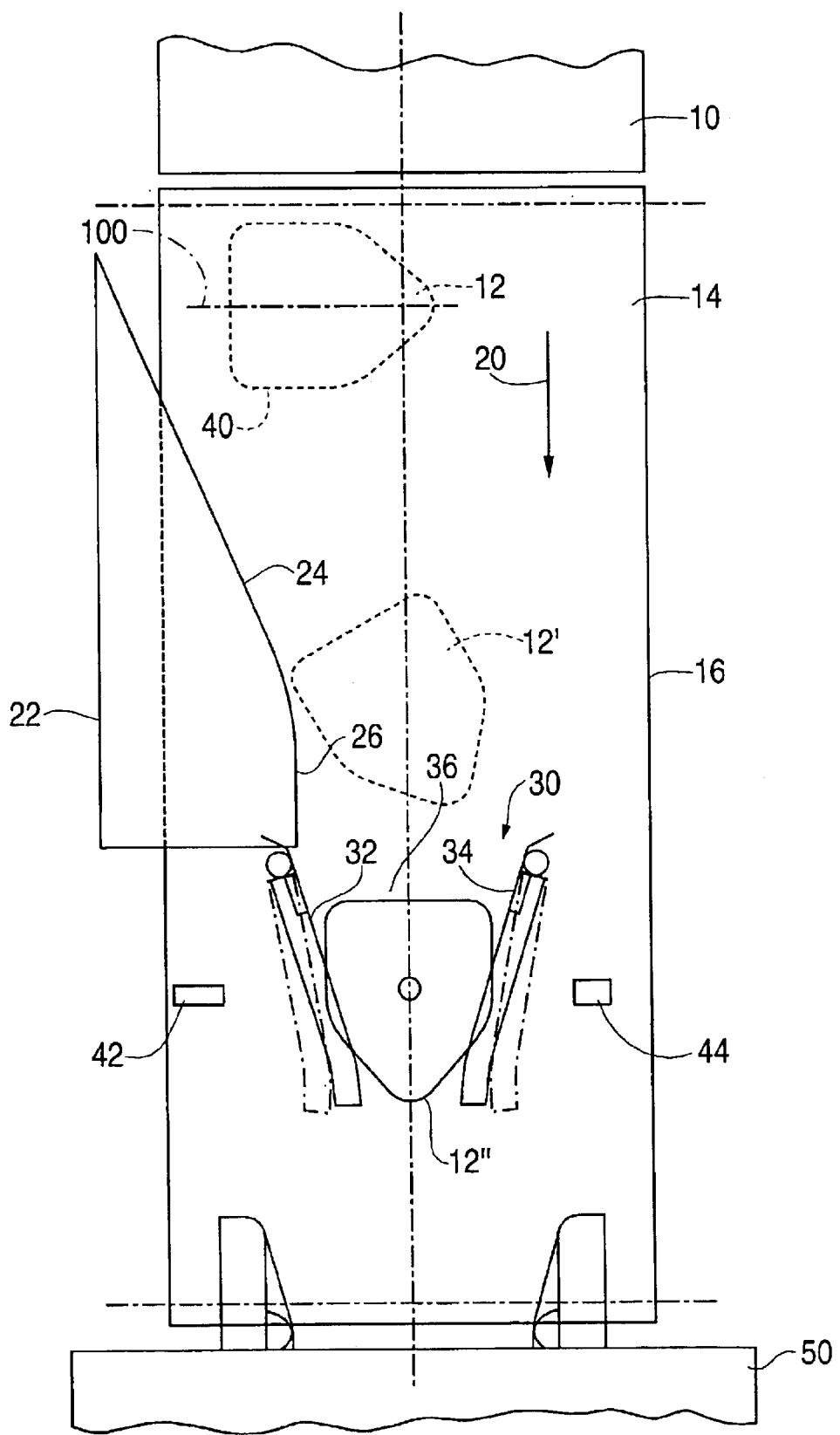
FIG. 1 is a schematic plan view of an apparatus, according to an embodiment of the invention.

The embodiment of the invention shown in FIG. 1 illustrates part of a production line for producing, for example, packaged and labeled chickens for sale in supermarkets. At the upstream end of the production line, part of a packaging machine 10 is shown. The packaging machine 10 outputs packaged chickens 12, each comprising, for example, a tray, a chicken in the tray, and plastic over-wrapping. The packaged chickens 12 are fed onto a conveying surface 14 of a conveyor belt 16, which is part of the apparatus of the present invention. As illustrated in an upper region of FIG. 1, the packaging machine 10 places each packaged chicken 12 onto the conveyor belt 16 with its long axis 100 extending transversely to the conveyor belt 16. Furthermore, the chickens 12 are placed off center on the conveyor belt 16.

The conveying surface 14 moves in the direction of arrow 20. An abutment member 22 is mounted, for example, over the conveying surface 14 in close proximity to, but not in contact with, the conveying surface 14. The abutment member 22 has, for example, a vertically extending abutment face or surface 24. The main portion of the abutment surface 24 extends at, for example, a small angle (about 20°) to the conveying direction. However, the present invention is not limited to this specific angle, and other angles would be appropriate to achieve the intended operation. A downstream end portion 26 of the abutment member 22 is parallel to the conveying direction.

Downstream of the abutment member 22, there is an orienting gate assembly 30. The orienting gate assembly 30 includes, for example, a pair of pivotally mounted gates 32, 34 whose bottom edges are, for example, slightly spaced from the conveying surface 14. The gates 32, 34 are pivoted adjacent to their upstream ends, about vertical axes, and are spring-biased to rest positions in which they define a channel 36 that narrows in the conveying direction. The channel 36 may be open at the end as shown, or can be closed. An actuator may be provided for simultaneously pivoting the pair of gates 32, 34 in opposite senses, to widen the downstream end of the passageway. The gates 32,34 have, for example, inwardly-facing abutment surfaces of low friction. The gate assembly 30 is, for example, centered on the conveyor belt 16.

The abutment member 22 is, for example, shaped and positioned so that it tends to feed articles (packaged chicken) into the channel 36.

In operation, a packaged chicken 12 is placed on the conveyor surface 14 by the packaging machine 10, as shown at the top of FIG. 1. Motion of the conveyor surface 14 in the direction of the arrow 20 brings a corner region 40 of the packaged chicken 12 into contact with the main angled portion of the abutment surface 24. The materials of the conveyor surface 14 and the abutment surface 24 are selected to be of, for example, fairly high friction. Thus, the continuing motion of the conveyor belt 16 causes the abutment surface 24 to exert a torque on the packaged chicken 12, leading to clockwise turning. By the time the packaged chicken 12 reaches the final part of the abutment surface 24, as shown by the packaged chicken 12', it has been displaced until it is substantially central on the conveyor belt 16, and rotated so that its long axis is at a much smaller angle to the conveying direction.

The continued motion of the conveyor belt 16 carries the packaged chicken 12' into the gate assembly 30. The packaged chicken 12' contacts the abutment surfaces of both gates 32, 34, which are, for example, low-friction surfaces and angled to further rotate the packaged chicken 12' into a centralized position, with its long axis parallel with the conveying direction, as shown by packaged chicken 12".

The presence of the packaged chicken 12" within the channel 36 may be detected. For example, there may by a radiation source 42 arranged to direct a beam of radiation across the conveyor surface 14, beneath the gates 32, 34, to be detected by a photocell 44, which is interrupted by the presence of the packaged chicken 12". After a predetermined interval, which is selected to allow the continuing motion of the conveying surface 14 to effect final reorientation, the actuator for the gates 32, 34 is automatically operated, causing the gates 32, 34 to open momentarily and allow the packaged chicken 12" to continue through. The packaged chicken 12" exits the conveyor belt 16 and passes to a workstation 50, for example, for the application and/or printing of a label.

While the abutment member 22 has been shown as having a specific shape, the present invention is not limited to an abutment member having this specific shape. Instead, various modifications can be made to the shape of the abutment member 22 to achieve the intended operation.

The present invention relates to the reorientation of articles, such as chickens. However, the articles are not limited to being chickens. More specifically, the articles are not limited, for example, to any particular size, shape, weight, or type of article. As an example, an article might be a bag of potato chips.

Moreover, the conveyor 16 is not limited, for example, to any particular size, shape, type or configuration of conveyor. Also, the gate assembly 30 is not limited, for example, to any particular number of gates, angles of surfaces, type of surfaces or configuration. Instead, various modifications can be made to the conveyor 16 and gate assembly 30 to achieve the intended operation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A reorientation apparatus, comprising:
   a conveyor having a support surface for an article to be reoriented, the conveyor being operable to displace the support surface in a conveying direction;
   an abutment member having an elongate abutment surface extending at an angle to the conveying direction adjacent the support surface, the article being conveyed, by displacement of the support surface, contacting the abutment surface, continued displacement of the support surface while the article is in contact with the support surface tending to turn the article as the article is conveyed while contacting the abutment surface; and
   an orienting gate assembly downstream of the abutment surface in the conveying direction, the gate assembly having a pair of gates displaceable between a first narrow or closed configuration in which the gates define a channel that narrows in the conveying direction to trap the article passing through the channel, and a second open configuration in which the channel is wider at least at a downstream end to release the trapped article.

2. The apparatus according to claim 1, wherein the support surface and the abutment surface have frictional surfaces that induce a torque while the article is conveyed sufficient to rotate the article to an intended position, and the gates have surfaces with a lower friction than that of the support surface and the abutment surface.

3. The apparatus according to claim 1, further comprising a radiation source and a radiation detector mounted on respective sides of the conveyor, wherein the gates are mounted above the support surface, the radiation source passing a beam of radiation under the gates and across the channel and the radiation detector detecting interruption of the beam of radiation.

4. The apparatus according to claim 1, further comprising an actuator urging displacement of the gates from the narrow configuration to the open configuration.

5. A method of reorienting articles, comprising:
conveying an article on a frictional support surface, the article contacting an angled frictional abutment surface as it is conveyed;
turning the article by continued conveyance and contact with the abutment surface;
directing the turned article into a narrowing passageway defined by a gate assembly, the article being momentarily stopped by engagement with the gate assembly to reorient the article in the narrowing passageway; and
opening the gate assembly, after the article has been reoriented, to continue conveyance of the article.

6. The method according to claim 5, wherein the article is conveyed by a conveyor and the article is positioned off center on the conveyor before the article is turned with a long axis of the article extending transversely to a conveying direction conveyor.

7. The method according to claim 6, wherein the abutment surface exerts a torque to turn the article being conveyed until the turned article is substantially central on the conveyor with the long axis positioned at a smaller angle to the conveying direction than before being turned.

8. The method according to claim 7, wherein the article is further rotated, after contacting the abutment surface, as the article engages the gate assembly until the long axis of the article is parallel with the conveying direction and centralized on the conveyor.

9. An apparatus for reorienting an article, comprising:
a conveyor supporting the article and moving in a conveying direction to move the article in the conveying direction;
an abutment member having an elongate abutment surface extending at an angle to the conveying direction, the article engaging the abutment member as the article is moved in the conveying direction by the conveyor to rotate the article; and
a gate assembly receiving the rotated article from the abutment member and further rotating the article to a predefined orientation, the gate assembly comprising a pair of gates defining a channel and being displaceable between a narrow position and an open position, the narrow position narrowing the channel in the conveying direction to trap the article, and the open position opening the channel to release the trapped article.

10. The apparatus according to claim 9, wherein the article is positioned off center on the conveyor before the article is rotated with a long axis of the article extending transversely to the conveyor.

11. The apparatus according to claim 10, wherein the abutment member exerts a torque to rotate the article being conveyed until the article is substantially central on the conveyor with the long axis positioned at a smaller angle to the conveying direction than before being rotated.

12. The apparatus according to claim 11, wherein the article is further rotated, after engaging the abutment member, as the article engages the gate assembly until the long axis of the article is parallel with the conveying direction and centralized on the conveyor.

13. The apparatus according to claim 9, wherein the gate assembly comprises a pair of gates defining a channel and being displaceable between a narrow position and an open position, the narrow position narrowing the channel in the conveying direction to trap the article, and the open position opening the channel to release the trapped article.

14. An apparatus for reorienting an article, comprising:
means for conveying the article on a frictional support surface;
means for turning the article as it is conveyed on the support surface by an elongate abutment member extending at an angle to the conveying direction; and
means for aligning the turned article on the support surface to place the article in a predefined orientation by receiving the turned article, temporarily trapping the turned article as it continues to turn, and releasing the trapped article after the trapped article has become aligned.

15. An apparatus for reorienting an article, comprising:
means for supporting an article and moving the article in a conveying direction;
means for rotating the article as the article is moved in the conveying direction by an article engaging abutment member having an elongate abutment surface extending at an angle to the conveying direction; and
means for receiving the rotated article from the abutment member, trapping and further rotating the trapped article to a predefined orientation, and releasing the trapped article after the trapped article has rotated to the predefined orientation.

16. An apparatus for reorienting an article, comprising:
an abutment member having an elongate abutment surface extending at an angle to a conveying direction of an article being conveyed, the article engaging the abutment member as the article is moved in the conveying direction to rotate the article; and
a gate assembly receiving the rotated article from the abutment member, trapping and further rotating the trapped article to a predefined orientation, and releasing the trapped article having the predefined orientation.

17. The apparatus according to claim 16, wherein the article is conveyed by a conveyor and the article is positioned off center on the conveyor before the article is rotated with a long axis of the article extending transversely to the conveyor.

18. The apparatus according to claim 17, wherein the abutment member exerts a torque to rotate the article being conveyed until the article is substantially central on the conveyor with the long axis positioned at an angle less than an angle transverse to the conveying direction.

19. The apparatus according to claim 18, wherein the article is further rotated as the article engages the gate assembly until the long axis of the article is parallel with the conveying direction and centralized on the conveyor.

20. An apparatus comprising:
a conveyor conveying an article in a conveying direction, the article being off-center on the conveyor and having a long axis extending traverse to the conveying direction;
an abutment member having an elongate abutment surface extending at an angle to the conveying direction so that the abutment member contacts the article as the article is being conveyed in the conveying direction, to thereby exert a torque on the article which rotates the article so that the long axis of the rotated article is at a smaller angle to the conveying direction than before being rotated; and a gate assembly receiving the rotated article as the rotated article continues to be conveyed in the conveying direction, trapping and further rotating the trapped article into a centralized position on the conveyor with the long axis of the article parallel to the conveying direction, and releasing the further rotated article to continue being conveyed by the conveyor.

21. An apparatus comprising:

means for conveying an article in a conveying direction along a conveying surface, the article being off-center on the conveying surface and having a long axis extending traverse to the conveying direction;

means for contacting the article by an elongate abutment member extending to an angle to the conveying direction as the article is being conveyed in the conveying direction, to thereby exert a torque on the article which rotates the article so that the long axis of the rotated article is at a smaller angle to the conveying direction than before being rotated; and means for receiving the rotated article, trapping and further rotating the trapped article into a centralized position on the conveying surface with the long axis of the article parallel to the conveying direction, and releasing the further rotated article to continue being conveyed in the conveying direction by said means for conveying.

22. A method of reorienting articles, comprising:

conveying an article in a conveying direction along a conveying surface, the article being off-centered on the conveying surface and having a long axis extending transverse to the conveying direction;

contacting the article as the article is being conveyed in the conveying direction, to thereby exert a torque on the article, which rotates the article so that the long axis of the rotated article is at a smaller angle to the conveying direction than before being rotated; and receiving the rotated article, and further rotating the article into a centralized position on the conveying surface with the long axis of the article parallel to the conveying direction, the further rotated article continuing to be conveyed in the conveying direction.

* * * * *

UNITED STATES PATENT AND TRADEMARK OFFICE
CERTIFICATE OF CORRECTION

PATENT NO. : 6,863,173 B2
DATED : March 8, 2005
INVENTOR(S) : Robert Bennett

It is certified that error appears in the above-identified patent and that said Letters Patent is hereby corrected as shown below:

Title page,
Item [56], References Cited, OTHER PUBLICATION, "EP Serach Report" reference change "Serach" to -- Search --.

Column 5, line 66 though Column 6, line 4,
Delete Claim 13.

Column 8,
Line 7, change "off-centered" to -- off-center --.

Signed and Sealed this

Twenty-seventh Day of September, 2005

JON W. DUDAS
*Director of the United States Patent and Trademark Office*